US008749209B2

(12) United States Patent
Feldtkeller

(10) Patent No.: US 8,749,209 B2
(45) Date of Patent: Jun. 10, 2014

(54) SYSTEM AND METHOD FOR PROVIDING ADAPTIVE DEAD TIMES

(75) Inventor: Martin Feldtkeller, Munich (DE)

(73) Assignee: Infineon Technologies Austria AG, Villach (AT)

( * ) Notice: Subject to any disclaimer, the term of this patent is extended or adjusted under 35 U.S.C. 154(b) by 1303 days.

(21) Appl. No.: 12/115,380

(22) Filed: May 5, 2008

(65) Prior Publication Data

US 2009/0273957 A1    Nov. 5, 2009

(51) Int. Cl.
*G05F 1/56* (2006.01)
*G05F 1/565* (2006.01)
*G05F 1/569* (2006.01)

(52) U.S. Cl.
USPC .......................................... 323/224; 323/285

(58) Field of Classification Search
USPC .................................. 323/224, 282, 284, 285
See application file for complete search history.

(56) References Cited

U.S. PATENT DOCUMENTS

| | | | |
|---|---|---|---|
| 5,099,138 A | 3/1992 | Fukunaga | |
| 5,973,943 A | 10/1999 | Ribarich et al. | |
| 6,331,755 B1 | 12/2001 | Ribarich et al. | |
| 6,879,115 B2 | 4/2005 | Ribarich | |
| 6,891,339 B2 | 5/2005 | Ribarich et al. | |
| 2006/0034123 A1 | 2/2006 | Feldtkeller et al. | |
| 2007/0013354 A1* | 1/2007 | Mok et al. | 323/284 |
| 2007/0126409 A1 | 6/2007 | Cannella et al. | |
| 2007/0182390 A1* | 8/2007 | Ishii et al. | 323/282 |
| 2007/0262762 A1* | 11/2007 | Yoshikawa | 323/282 |
| 2008/0024093 A1* | 1/2008 | Yoshikawa | 323/222 |
| 2008/0030176 A1* | 2/2008 | Sutardja et al. | 323/271 |
| 2008/0088283 A1* | 4/2008 | Ruobiao et al. | 323/271 |

FOREIGN PATENT DOCUMENTS

| | | |
|---|---|---|
| DE | 4032014 | 5/1991 |
| DE | 10 2004 009 994 A1 | 9/2005 |
| EP | 0430358 | 6/1991 |
| EP | 0 430 358 B1 | 10/1995 |
| EP | 1 155 492 B1 | 3/2004 |
| EP | 1 275 276 B1 | 6/2005 |
| EP | 1 277 374 B1 | 11/2005 |
| WO | WO 03/059017 A1 | 7/2003 |
| WO | WO03059017 | 7/2003 |
| WO | WO 2005/079513 A2 | 9/2005 |

* cited by examiner

*Primary Examiner* — Adolf Berhane
*Assistant Examiner* — Nusrat Quddus
(74) *Attorney, Agent, or Firm* — Slater & Matsil, L.L.P.

(57) ABSTRACT

System and method for adaptively altering a power supply's dead time. A method comprises detecting a start of a dead time, detecting an ending condition of the dead time, and ending the dead time. The detecting of the ending condition is based on a first current flowing through a lower portion of the power supply or a second current flowing through a gate driver of a lower switching element in the power supply.

21 Claims, 8 Drawing Sheets

SYSTEM AND METHOD FOR PROVIDING ADAPTIVE DEAD TIMES

TECHNICAL FIELD

The present invention relates generally to a system and a method for power supplies, and more particularly to a system and a method for adaptively altering a power supply's dead time.

BACKGROUND

FIG. 1a illustrates a fluorescent lamp's electronic ballast 100. The electronic ballast 100 includes a half-bridge circuit 105, a drive circuit 110, and a load circuit 115. The half-bridge circuit 105 may include two semiconductor switching elements, Q1 120 and Q2 122, which are connected in series with respect to voltage supply terminals T1 and T2 of a voltage supply that supplies a direct current (DC) voltage with potential Vb. The drive circuit 110 generates two control signals, S1 and S2, that may be used to control the state of the two semiconductor switching elements. FIG. 1b illustrates a semiconductor switching element, such as the semiconductor switching element Q1 120. The semiconductor switching element Q1 120 may use a wide variety of semiconductor transistors, such as an N-type enhancement mode MOSFET. However, other types of semiconductor transistors may be used as the semiconductor switching element Q1 120, including N- and P-type JFETs, N- and P-type depletion mode MOSFETs, P-type enhancement mode MOSFETs, and so forth.

The drive circuit 110 may be configured so that the two control signals are generated in such a manner that the two semiconductor switching elements are never switched on simultaneously. A time when both semiconductor switching elements are switched off may be referred to as a dead time. During the dead time, a voltage potential across the load circuit 115 may be brought up (or down) to being substantially equal to either the voltage potential of the voltage supply Vb (or ground). With both terminals of a semiconductor switching element at the same or substantially the same potential, the drive circuit 110 may then generate an appropriate control signal to switch the state of semiconductor switching element. The switching with both terminals of the semiconductor switching element at the same or substantially the same voltage potential is commonly referred to as zero voltage switching (ZVS). ZVS offers high efficiency since there is no or very little power dissipated in the semiconductor switching element while switching. However, if the dead time's duration is too long (or too short), then the ZVS condition may no longer exist (or may have not yet occurred).

SUMMARY OF THE INVENTION

These and other problems are generally solved or circumvented, and technical advantages are generally achieved, by preferred embodiments which provides a system and method for adaptively altering a power supply's dead time.

In accordance with a preferred embodiment, a method for adaptively controlling a dead time in a half bridge circuit having an upper portion with an upper switching element and a lower portion with a lower switching element is provided. The method includes detecting a start of the dead time, detecting an ending condition of the dead time, and ending the dead time. The detecting is based on a first current flowing through a shunt resistor in the lower portion or a second current through a lower gate driver of the lower switching element.

The foregoing has outlined rather broadly the features and technical advantages of the embodiments in order that the detailed description of the embodiments that follows may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the invention. It should also be realized by those skilled in the art that such equivalent constructions do not depart from the spirit and scope of the embodiments as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a fluorescent lamp electronic ballast. The invention may also be applied, however, to other applications, such as other lamp ballasts like a high intensity discharge (HID) ballast or an LLC converter used in a switching power supply for applications such as notebook computers, flat panel displays, and so forth.

Figure 1A:
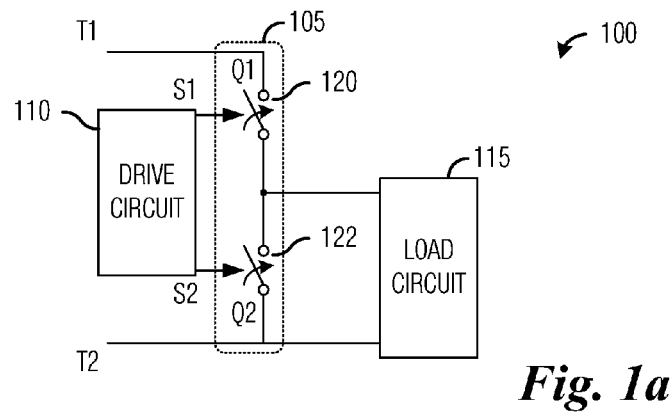
FIG. 1a is a diagram of a fluorescent lamp's electronic ballast.
Figure 1B:
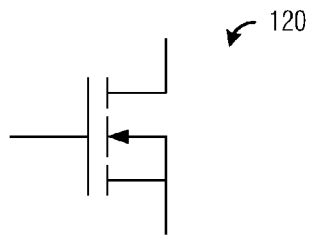
FIG. 1b is a diagram of a semiconductor switching element.
Figure 2:
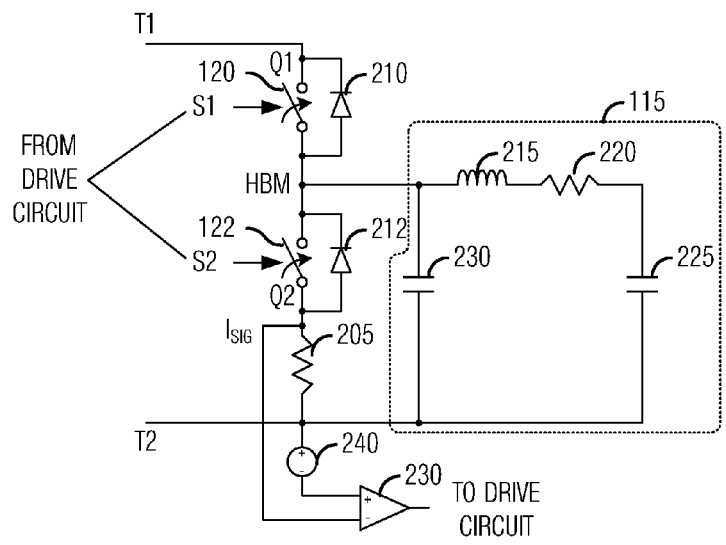
FIG. 2 is a diagram of an electronic ballast 200 for a fluorescent lamp, wherein the electronic ballast 200 is capable of adaptively changing dead time.

With reference now to FIG. 2, there is shown a diagram of an electronic ballast 200 for a fluorescent lamp, wherein the electronic ballast 200 is capable of adaptively changing dead time. The electronic ballast 200 includes two semiconductor switching elements, Q1 120 and Q2 122, which are connected in series with a shunt resistor 205. The two semiconductor switching elements and the shunt resistor 205 may, in turn, be connected in series with respect to voltage terminals T1 and T2 of a voltage supply supplying a DC voltage at potential Vb. The two semiconductor switching elements may be controlled by control signals S1 and S2 generated by a drive circuit.

Each of the two semiconductor switching elements may have connected in parallel, a diode (diode 210 for semiconductor switching element Q1 120 and diode 212 for semiconductor switching element Q2 122). Alternatively, the diodes may be intrinsic to the switching elements themselves. The diodes may enable a current path from the load circuit to the voltage terminal T1 or to the voltage terminal T2 when the two semiconductor switching elements are turned off.

The electronic ballast 200 may be coupled to a load circuit 115 with the load circuit 115 being coupled in between the two semiconductor switching elements. The load circuit 115 includes an inductive load 215, a resistive load 220, and a capacitive load 225. The load circuit 115 also includes a discharge capacitor 230. The discharge capacitor 230 may allow for a load current in the load circuit 115 to dissipate during the dead time.

A comparator 230 may be used to compare a voltage drop over the shunt resistor 205 and a reference voltage provided by a voltage supply 240. During the dead time, the voltage drop over the shunt resistor 205 may be an indicator of the voltage potential difference between the terminals of the semiconductor switching device Q2 122 and may be used to detect conditions conducive to ZVS. For example, the comparator 230 may be configured to assert a specified value on its output if the voltage drop over the shunt resistor 205 is substantially equal to the reference voltage. An output of the comparator 230 may be provided to the drive circuit, where it may be used to terminate the dead time.

Figure 3A:
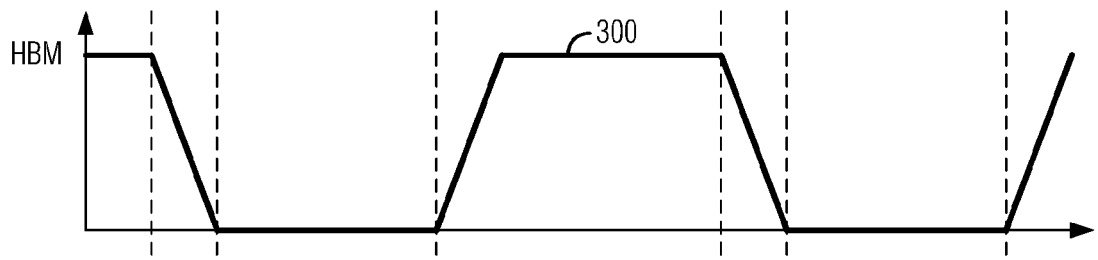
FIGS. 3a through 3d are diagrams of signals in the electronic ballast 200.
Figure 3B:
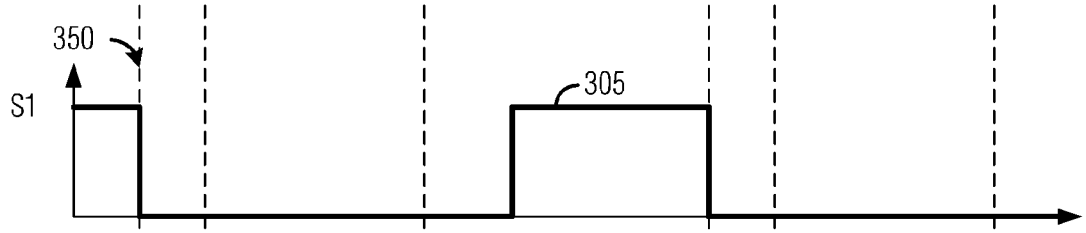
Figure 3C:
Figure 3D:
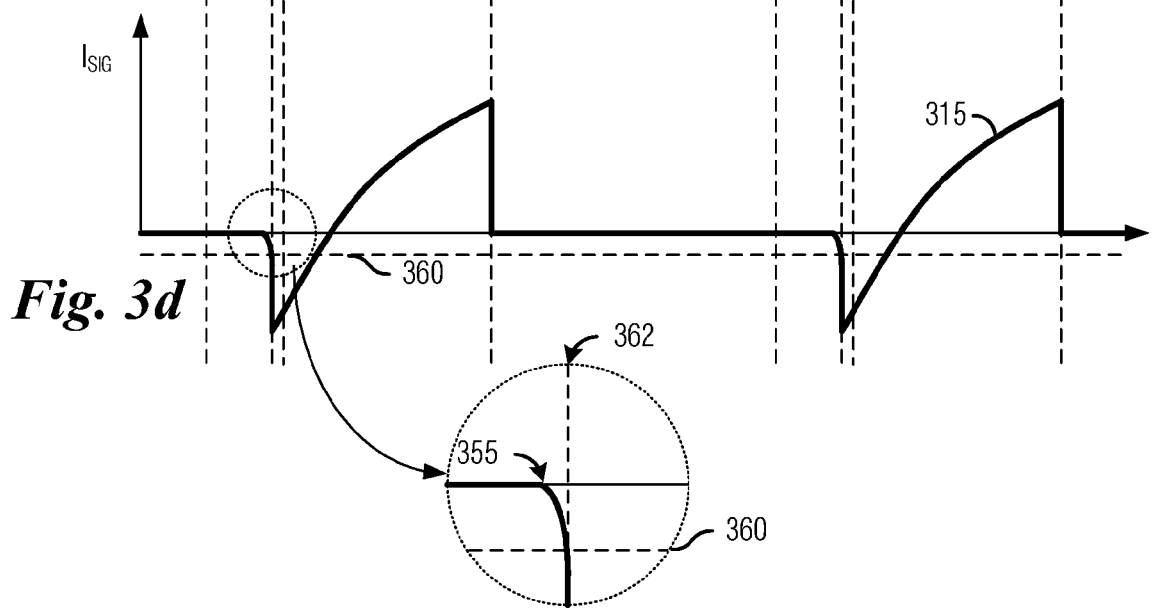

FIGS. 3a through 3d are diagrams of waveforms of signals in the electronic ballast 200. FIG. 3a is a diagram of a voltage potential at node HBM (shown as a first trace 300), FIG. 3b is a diagram of the control signal S1 (shown as a second trace 305), FIG. 3c is a diagram of the control signal S2 (shown as a third trace 310), and FIG. 3d is a diagram of a current through the shunt resistor 205 (shown as a fourth trace 315).

While the semiconductor switching device Q1 120 is turned on (control signal S1 is at a high value), the voltage potential at node HBM may be substantially equal to the voltage potential of the voltage supply (Vb). When the semiconductor device Q1 120 is turned off (control signal S1 is at a low value) at time event 350, the voltage potential at node HBM begins to drop as the load current dissipates through the discharge capacitor 230. The drop in the voltage potential at node HBM may be substantially linear in nature. The barrier capacitance of the semiconductor switching device Q2 122 may be negligible when compared to the capacitance of the discharge capacitor 230.

Then as the voltage across the semiconductor switching device Q2 122 decreases, a drain-source capacitance of the semiconductor switching device Q2 122 may substantially increase, increasing at least to the order of the discharge capacitor 230. The load current may dissipate through both the discharge capacitor 230 and a drain-source capacitance of the semiconductor switching device Q2 122 with the amount of current dissipation being defined by a ratio of the two capacitances. As the drain-source capacitance increases, the part of the load current which flows through the drain-source capacitance and the shunt resistor 205 also increases. This negative current leads to a negative voltage across the shunt resistor. At a time event 355, the drain-source capacitance starts to increase and the voltage across the shunt resistor starts to fall (as shown in FIG. 3d). As the voltage across the semiconductor switching device Q2 122 continues to drop and changes sign, substantially the entirety of the load current begins to flow through the diode 212. The comparator 230 may be configured to detect when the load current falls below a threshold 360 (at time event 362). Rather than using the comparator 230 to detect when the load current falls below the threshold 360, which may require a comparison with negative reference voltage, the comparator 230 may utilize a built-in voltage offset created using circuit asymmetry.

After the comparator 230 detects that the load current has fallen below the threshold 360, the comparator 230 asserts the specified value on its output, which may then be provided to the drive circuit. The drive circuit may then turn on the semiconductor switching device Q2 122 by switching the control signal S2 to a high value at time event 365, effectively ending the dead time. The dead time may be ended when a monitored signal reaches a desired value, not after the elapsing of a specified period of time. A small delay may exist between the time event 362 (when the load current begins to flow through the diode 212) and the time event 365 when the drive circuit turns on the semiconductor switching device Q2 122. The delay may be the result of propagation delays in electronic circuits, for example. Compensation for the delay may be possible by changing the threshold 360.

The load current through a load (such as the inductor 215 and the resistor 220) may comprise two components. A first component, a non-reactive (resistive) component, of the load current may be related to a resistive part of the load (the resistor 220) and may flow through the shunt resistor 205 while the semiconductor switching device Q2 122 or the diode 212 are conducting. The non-reactive component of the load current may lead to an average component of the current flow through the shunt resistor (shown in FIG. 3d as the fourth trace 315), which may be positive (as shown in FIG. 3d). A second component, an inductive (reactive) component of the load current may be related to an inductive part of the load (the inductor 215) and may produce a slope of the current through the shunt resistor 205 while the semiconductor switching device Q2 122 or the diode 212 are conducting. The second component (the slope or derivate of the current flow through the shunt resistor 205) may also be positive while it flows through the shunt resistor 205.

The polarity of the current threshold (the threshold 360) may be opposite of the polarity of the resistive component of the load current through the shunt resistor 205. Additionally, if there is no resistive load, the polarity of the current threshold may be opposite of the polarity of the current slope while the load current flows through the shunt resistor 205. Therefore, it may be possible to detect the time event 355 and/or the time event 362 by simply comparing the load current through the shunt resistor 205 with a threshold having a polarity which may be opposite of the polarity of a resistive component of the load current through the shunt resistor 205 or opposite of the polarity of a slope of the load current through the shunt resistor 205.

The above discussion focused on adaptively setting the dead time for a high to low transition in the voltage potential at the node HBM when the semiconductor switching device Q1 120 is turned off to start the dead time and then the semiconductor switching device Q2 122 is turned on to end the dead time. A different technique may be used for adaptively setting the dead time for a low to high transition when the semiconductor switching device Q2 122 is turned off to start the dead time and then the semiconductor switching device Q1 120 is turned on to end the dead time. The technique may exploit symmetry present in the high to low transition and the low to high transition and may make use of measuring the dead time duration during the high to low transition and using substantially the same dead time duration for the low to high transition.

The measuring of the duration of the dead time during the high to low transition may be accomplished using digital and/or analog techniques. Digital measurement techniques may include the use of a high frequency clock with a period significantly shorter than an expected duration of the dead time and a counter to count periods of the high frequency clock, for example. When the semiconductor switching device Q1 120 is turned off (starting the dead time), the high frequency clock may be started and the counter may begin counting periods of the high frequency clock. The counter may continue until the semiconductor switching device Q2 122 is turned on, ending the dead time. The duration of the dead time may then be computed from the value of the counter and the period of the high frequency clock. Alternative techniques for digitally measuring the duration of the dead time may utilize a high resolution timer, and so forth.

Figure 4:
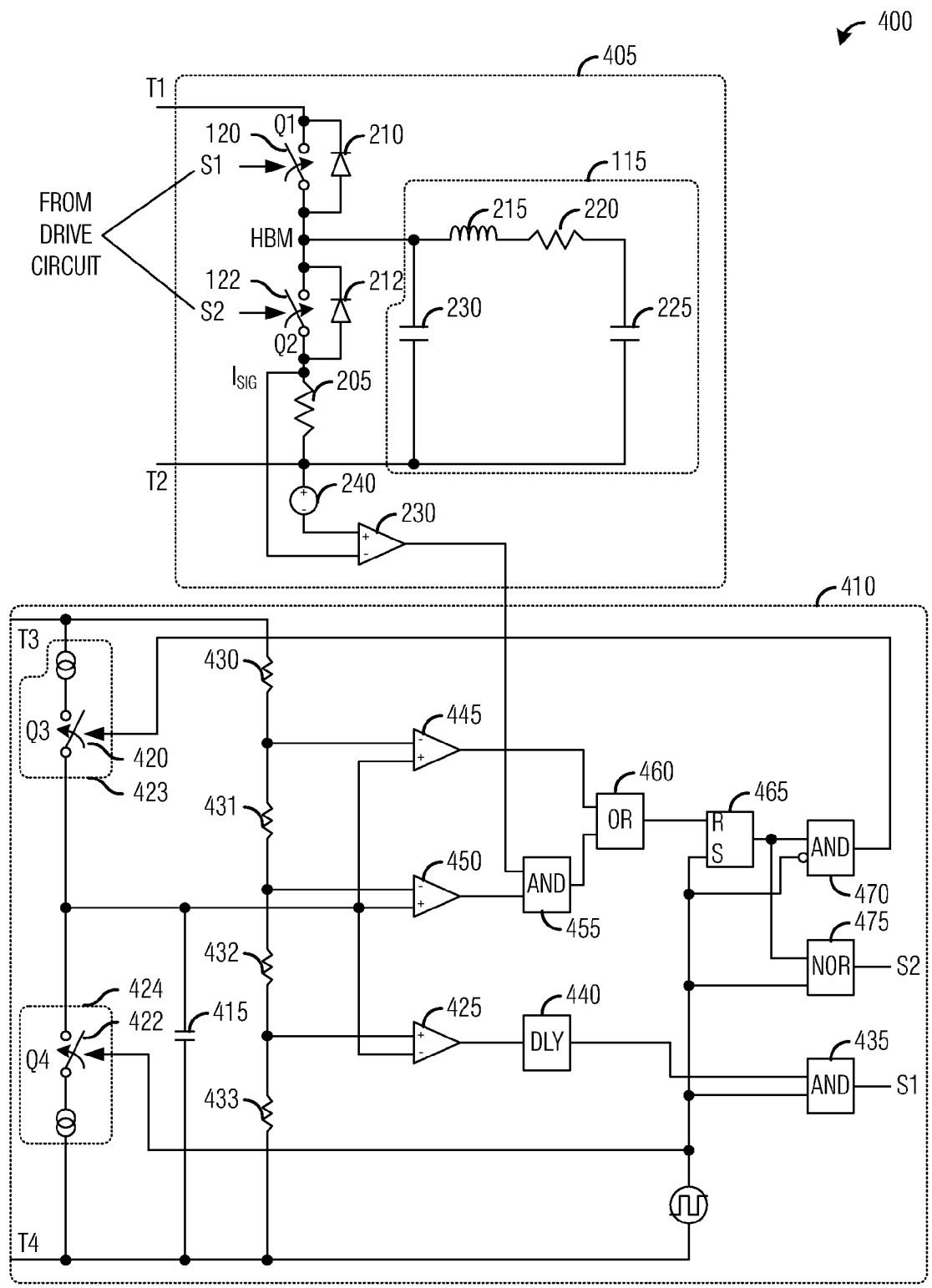
FIG. 4 is a diagram of an electronic ballast 400 for a fluorescent lamp.

FIG. 4 illustrates a fluorescent lamp's electronic ballast 400, the electronic ballast 400 having the capability of adaptively changing dead time for both high to low and low to high transitions. The electronic ballast 400 includes a ballast circuit 405 that may be substantially similar to the electronic ballast 200 shown in FIG. 2. The electronic ballast 400 includes a drive circuit 410 that may be used to generate control signals S1 and S2 that may be used to control the operation of the ballast circuit 405.

The drive circuit 410 includes a ramp capacitor 415 that may be driven by a half-bridge circuit containing two semiconductor switching devices, Q3 420 and Q4 422. The two semiconductor switching devices Q3 420 and Q4 422 may be connected in series with a voltage supply having terminals T3 and T4. When the semiconductor switching device Q1 120 is turned off (the control signal S1 becoming low), the semiconductor switching device Q3 420 may be turned on to create a current path from terminal T3 through the semiconductor switching device Q3 420 through the ramp capacitor 415 to terminal T4. The voltage drop over the ramp capacitor 415 may then increase at a substantially linear rate. It may be possible to use a switchable current source or switchable current sink to replace a semiconductor switching device and current source/sink pair, such as a first pairing 423 comprising the semiconductor switching device Q3 420 and attendant current source and a second pairing 424 comprising the semiconductor switching device Q4 422 and attendant current sink.

The voltage drop over the ramp capacitor 415 may continue to increase until the semiconductor switching device Q2 122 is turned on (the control signal S2 becoming high) and ending the high to low dead time. This may then turn off the semiconductor switching device Q3 420 to electrically isolate the ramp capacitor 415, maintaining the voltage drop over the ramp capacitor 415. Since the voltage drop over the ramp capacitor 415 continued to increase until the semiconductor switching device Q2 122 was turned on and ending the high to low dead time, the voltage drop over the ramp capacitor 415 may be proportional to the duration of the high to low dead time and may be a measure of the duration of the high to low dead time.

When the low to high dead time begins with the semiconductor switching device Q2 122 turning off (the control signal S2 becoming low), the semiconductor switching device Q4 422 may be turned on creating a discharge path for the ramp capacitor 415. The charge on the ramp capacitor 415 may ramp down at substantially the same rate as it ramped up. A comparator 425 may compare a voltage drop over the ramp capacitor 415 with a threshold, with the threshold being set by a series of resistors 430-433. When the voltage drop over the ramp capacitor 415 is substantially equal to the threshold, the duration of the low to high dead time may be substantially equal to the high to low dead time and therefore, may be ended. A logical AND gate 435 may be used to combine the output of the comparator 425 to create the control signal S1 that may be used to control the state of the semiconductor switching device Q1 120.

As the charge on the ramp capacitor 415 drops to about zero, a measure of distortion may begin to appear and change the substantially linear ramp down into a non-linear ramp down. To compensate for the non-linear behavior, the threshold used in the comparison with the voltage drop over the ramp capacitor 415 in the comparator 425 may be at a level above zero, above a point wherein the ramp down begins to exhibit the non-linear behavior. Then, a delay element 440 may be used to delay the output of the comparator by an amount of time proportional to an expected amount of time for the voltage drop over the ramp capacitor 415 to discharge from the threshold level to substantially zero.

In addition to measuring the duration of the high to low dead time and applying the measured duration to the low to high dead time, the driver circuit 410 also includes circuitry to prevent a dead time from lasting indefinitely and a dead time from being too short in duration. A comparator 445 may compare the voltage drop over the ramp capacitor 415 with a second threshold to determine if the low to high dead time is lasting longer than desired, with the second threshold being generated by a series of resistors 430-433. The comparison made by the comparator 445 helps to ensure that the low to high dead time does not extend for longer than a maximum desired dead time. This may be achieved by terminating the high to low dead time only if the charge on the ramp up capacitor 415 has exceeded a minimum value, even if an ending condition has been detected. Similarly, a comparator 450 compares the voltage drop over the ramp capacitor 415 with a third threshold to ensure that the low to high dead time is not too short in duration. This may be achieved by terminating the high to low dead time if the charge on the ramp up capacitor 415 has exceeded a maximum value, even if an ending condition for the high to low dead time has not been detected.

Logical gates, such as a logical AND gate 455 and a logical OR gate 460 may be used to generate a reset signal for a flip flop 465, such as an R-S flip flop. A logical AND gate 470 may be used to generate a control signal to control the state of the semiconductor switching device Q3 420 and a logical NOR gate 475 may be used to generate the control signal S2 to control the state of the semiconductor switching device Q2 122.

The specific circuit elements used in the description of the drive circuit 410 are used for illustrative purposes. Other circuit elements may be used in their place and provide similar functions. Therefore, the description of the specific circuit elements should not be construed as being limiting to either the spirit or the scope of the embodiments.

Figure 5A:
FIGS. 5a through 5e are diagrams of signals in the electronic ballast 400.
Figure 5B:
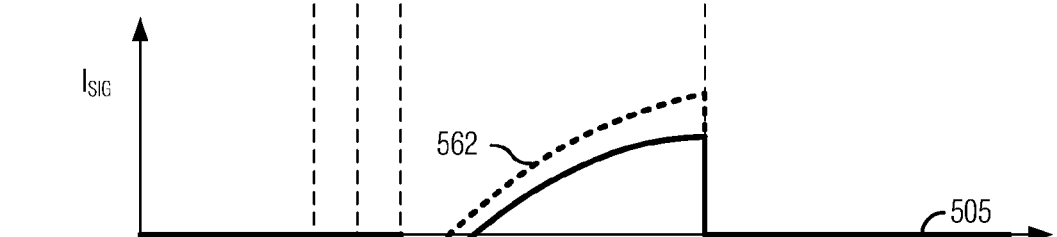
Figure 5C:
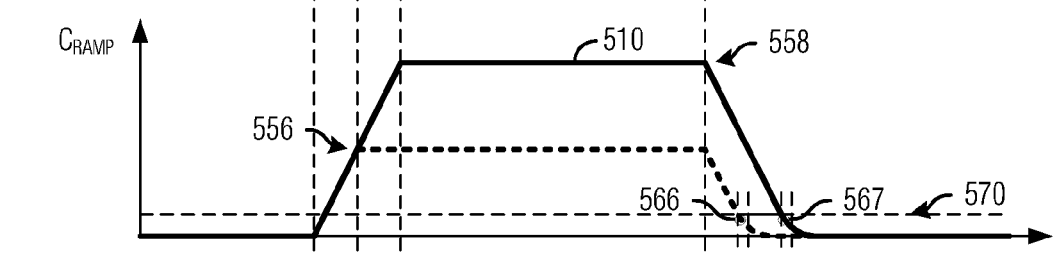
Figure 5D:
Figure 5E:
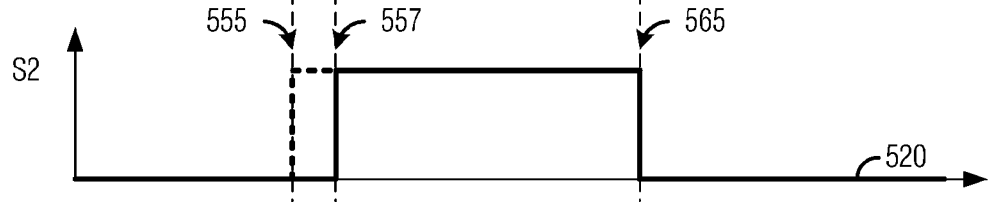

FIGS. 5a through 5e are diagrams of waveforms of signals in the electronic ballast 400. FIG. 5a is a diagram of a voltage potential at node HBM (shown as a first trace 500), FIG. 5b is a diagram of a current through the shunt resistor 205 (shown as a second trace 505), FIG. 5c is a diagram of a voltage potential across the ramp capacitor 415 (shown as a third trace 510), FIG. 5d is a diagram of the control signal S1 (shown as a fourth trace 515), and FIG. 5e is a diagram of the control signal S2 (shown as a fifth trace 520).

While the semiconductor switching device Q1 120 is turned on (control signal S1 at a high value), the voltage potential at node HBM may be substantially equal to the voltage potential of the voltage supply (Vb). When the semiconductor device Q1 120 is turned off (control signal S1 at a low value) at time event 550, the voltage potential at node HBM begins to drop as the load current dissipates through the discharge capacitor 230. The drop in the voltage potential at node HBM may be substantially linear in nature.

While the load current dissipates through the discharge capacitor 230, the voltage potential across the ramp capacitor 415 ramps up, with the ramp up continuing in a substantially linear manner until the semiconductor switching device Q2 122 turns on (control signal S2 at a high value) terminating the high to low dead time. The amount of the ramp up may be dependent on when the semiconductor switching device Q2 122 turns on and therefore may be a function of the duration of the high to low dead time. If the semiconductor switching device Q2 122 turns on early (for example, at time event 555), then the voltage potential across the ramp capacitor 415 stops at a lower level (level 556) than if the semiconductor switching device Q2 122 turns on later (for example, at time event 557), shown as level 558. Dashed lines 560 and 562 in FIGS. 5a and 5b illustrate the effect of the timing of the turning on of the semiconductor switching device Q2 122 on the voltage potential at node HBM and the current through the shunt resistor 205, respectively.

At time event 565, the semiconductor switching device Q2 122 is turned off (control signal S2 at a low value) starting the low to high dead time. The voltage potential across the ramp capacitor 415 may then begin to ramp down (discharge), with the discharge being substantially linear until the voltage potential becomes nearly zero. As the voltage potential across the ramp capacitor 415 approaches zero, distortion may begin to affect the ramp down, potentially making it non-linear. This may be referred to as a non-linear point, shown in FIG. 5c as point 566 and point 567. To help prevent the distortion from negatively affecting the duration of the low to high dead time, a comparison of the voltage potential of the ramp capacitor 415 with a threshold 570 that may be at a level above where the distortion begins to make the ramp down non-linear. As shown in FIG. 5c, the threshold 570 may be located at a level above the non-linear points 566 and 567. A small delay (interval 575 and 576) may be inserted to compensate for a duration about equal to a ramp down in the voltage potential across the ramp capacitor 415 from the threshold 570 to about zero.

Figure 6A:
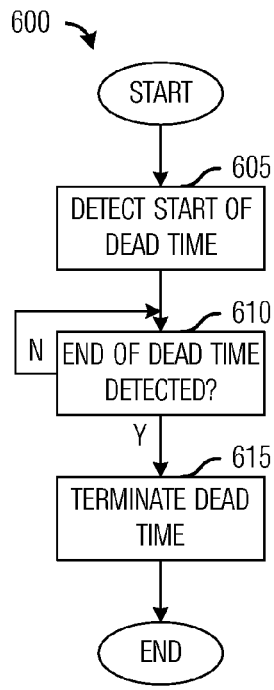
FIG. 6a is a diagram of a sequence of events in the adaptive control of a dead time.

FIG. 6a illustrates a sequence of events 600 in the adaptive control of the duration of a dead time. The adaptive control of the duration of a dead time may take place when an electronic circuit, such as an electronic ballast for a fluorescent lamp or an LLC converter for a laptop computer or flat panel display, is in a normal operating mode. The adaptive control of the duration of a dead time may begin with the detection of a start of a dead time (block 605). For example, in an electronic ballast, such as the electronic ballast 200 or 400, a dead time may begin with a turning off of the semiconductor switching device Q1 120 with the semiconductor switching device Q2 122 already off.

Figure 7:
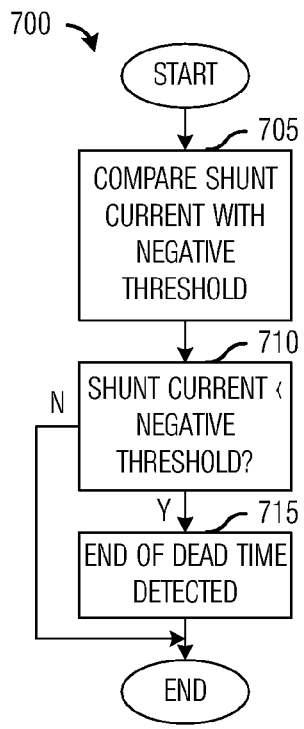
FIG. 7 is a diagram of a sequence of events in the detection of an end condition for a dead time.

With the dead time started, an end condition for the dead time may be detected (block 610). Depending on configuration of the electronic ballast 200 or 400, there may be several different end conditions for the dead time. A first end condition for the dead time may be a current flowing through the shunt resistor 205 becoming more negative than a negative threshold. FIG. 7 illustrates a sequence of events 700 in the detecting of an end condition of the dead time, wherein the end condition comprises a current flowing through the shunt resistor exceeding a negative threshold. The detecting the end condition of the dead time includes comparing the current flowing through the shunt resistor 205 with a negative threshold (block 705). The comparison may be performed by a comparator, such as the comparator 230. If the current flowing through the shunt resistor 205 is more negative than the negative threshold (block 710), then the end condition of the dead time may have been met (block 715). If the current flowing through the shunt resistor 205 is not more negative than the negative threshold, then the end condition of the dead time may not have been met and more time may be permitted to elapse.

A second end condition for the dead time may be a gate driver current exceeding a positive threshold. FIG. 8a illustrates an electronic ballast 800 for a fluorescent lamp. The electronic ballast 800 includes two semiconductor switching devices Q1 120 and Q2 122, a load circuit 115 coupled to the two semiconductor switching devices, and a two gate drivers, gate driver 805 for the semiconductor switching device Q1 120 and gate driver 807 for the semiconductor switching device Q2 122. The electronic ballast 800 further includes a current sensor 809 that may be used to sense a magnitude of the current from the gate driver 807 to the semiconductor switching device Q2 122. The current sensor 809 may be coupled to a threshold detector 810, which may be used to compare the output of the current sensor 809 to a threshold.

Alternatively, the electronic ballast 800 may use a transimpedance amplifier to convert the gate driver current of the gate driver 807 for the semiconductor switching device Q2 122 into a voltage that may be compared with a threshold to determine the end condition for the dead time started by turning off the semiconductor switching device Q1 120. The transimpedance amplifier may compare the gate driver current of the gate driver 807 with a gate current of the semiconductor switching device Q2 122, for example.

Figure 8E:
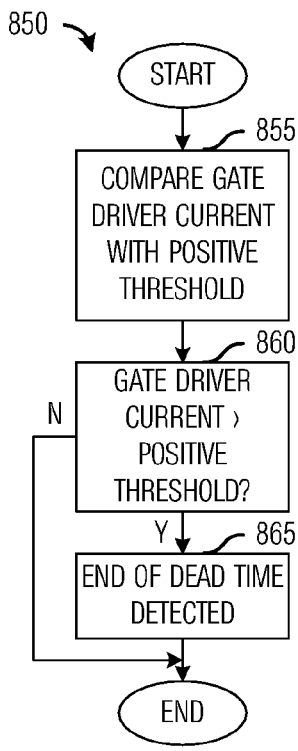
FIG. 8e is a diagram of a sequence of events in the detection of an end condition for a dead time.
Figure 8A:
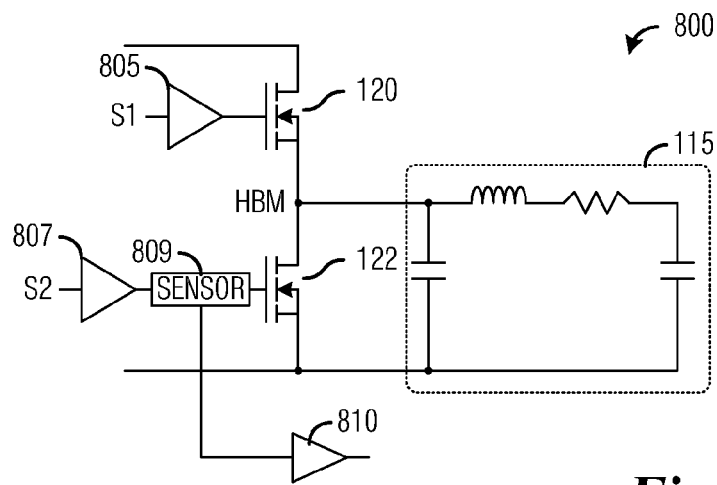
FIG. 8a is a diagram of an electronic ballast 800 for a fluorescent lamp.
Figure 8B:
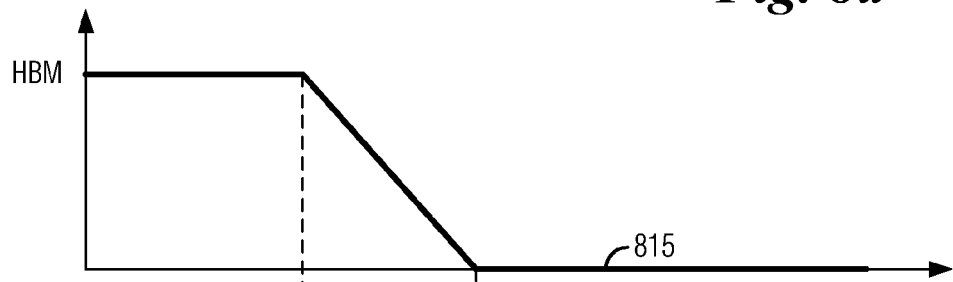
FIGS. 8b through 8d are diagrams of signals in the electronic ballast 800.
Figure 8C:
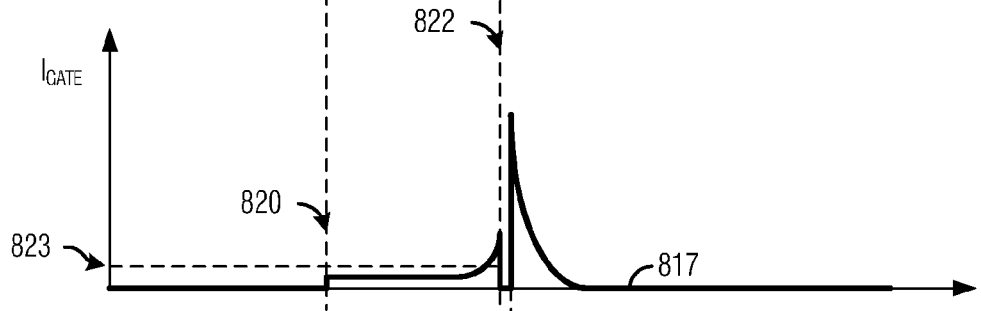
Figure 8D:
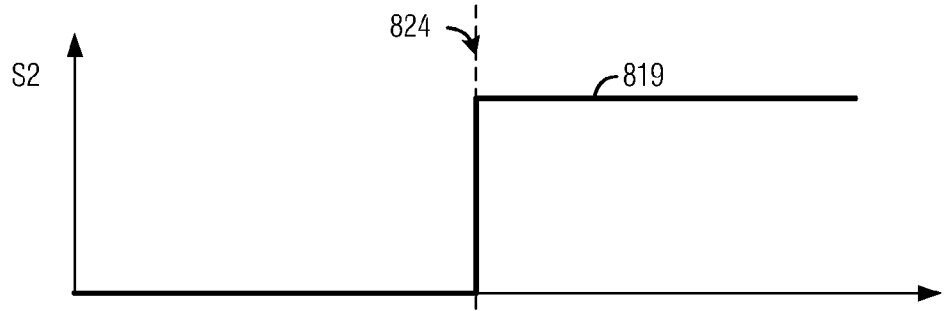

FIGS. 8b through 8d are diagrams of signals in the electronic ballast 800. FIG. 8b is a diagram of a voltage potential at node HBM (shown as a first trace 815), FIG. 8c is a diagram of the gate driver current of the gate driver 807 (shown as a second trace 817), and FIG. 8d is a diagram of the control signal S2 (shown as a third trace 819).

After the semiconductor switching device Q1 120 is turned off at time event 820, the voltage potential at the node HBM begins to drop and the gate current of the gate driver 807 increases by a small amount. As the voltage potential at the node HBM approaches zero (time event 822), the gate current of the gate driver 807 may increase dramatically due to a nonlinearity of the drain-gate capacitance of the semiconductor switching device Q2 122. A comparison of the gate current of the gate driver 807 with a threshold 823 may be used to determine when the voltage potential at the node HBM approaches zero. Once the gate current of the gate driver 807 exceeds the threshold 823, the semiconductor switching device Q2 122 may be turned on (at time event 824) to terminate the dead time.

FIG. 8e illustrates a sequence of events 850 in the detecting an end condition of the dead time, wherein the end condition comprises the gate current of a gate driver exceeding a threshold. The detecting the end condition of the dead time includes comparing a gate current of the gate driver 807 with a positive threshold, such as the threshold 823 (block 855). The comparison may be performed by a comparator, such as the comparator 810. If the gate current of the gate driver 807 is more positive than the threshold 823 (block 860), then the end condition of the dead time may have been met (block 865). If the gate current of the gate driver 807 is not more positive than the threshold 823, then the end condition of the dead time may not have been met and more time may be permitted to elapse.

A third end condition for the dead time may be a current in a rectifier circuit changing from a relatively constant negative value during the high to low dead time to substantially zero when the high to low dead time completes. FIG. 9a illustrates an electronic ballast 900 for a fluorescent lamp. The electronic ballast 900 includes a rectifier circuit 905 coupled to node HBM, between the load circuit 115 and the two semiconductor switching devices Q1 120 and Q2 122. The rectifier circuit 905 includes a shunt resistor 910 that may be used to measure a current in the rectifier circuit 905. A comparator 915 may compare a voltage drop over the shunt resistor 910 with a reference voltage and may detect when the voltage drop over the shunt resistor 910 (and hence, the current in the rectifier circuit 905) returns to being substantially zero after having been relatively steady at a negative value for a period of time about equal to the high to low dead time.

Figure 9D:
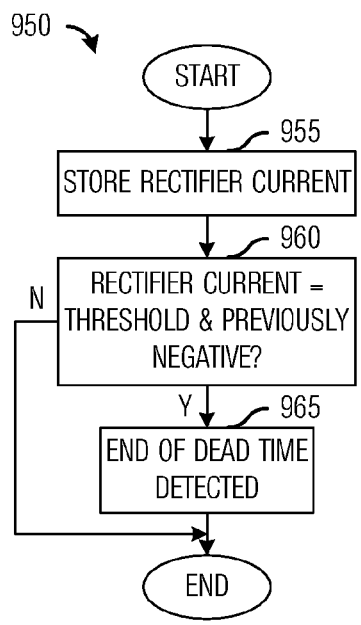
FIG. 9d is a diagram of a sequence of events in the detection of an end condition for a dead time.
Figure 9A:
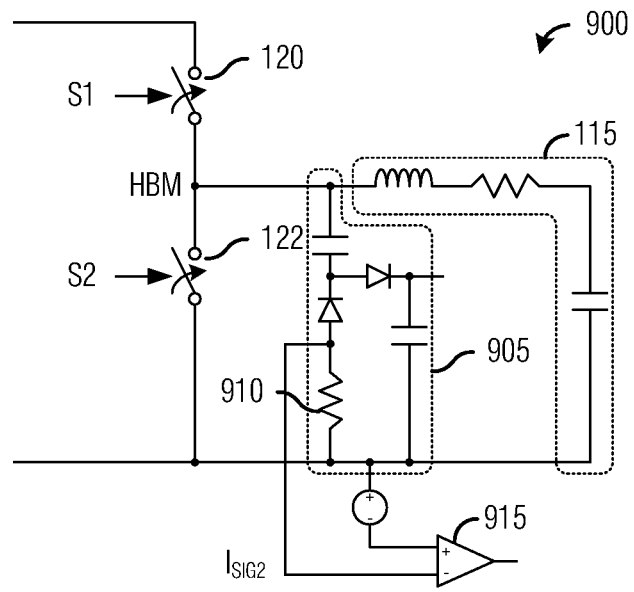
FIG. 9a is a diagram of an electronic ballast 900 for a fluorescent lamp.
Figure 9B:
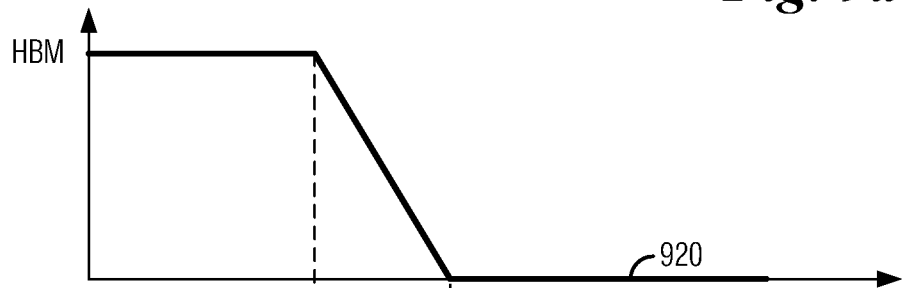
FIGS. 9b and 9c are diagrams of signals in the electronic ballast 900.
Figure 9C:
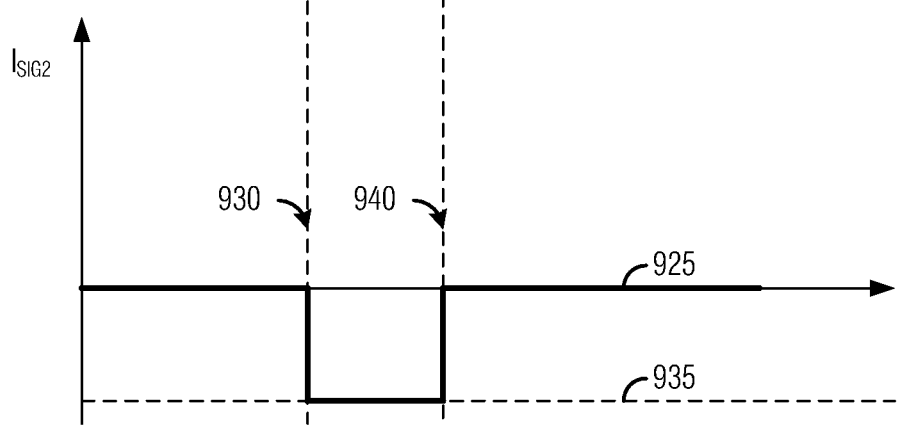

FIGS. 9b and 9c are diagrams of signals in the electronic ballast 900. FIG. 9b is a diagram of a voltage potential at node HBM (shown as a first trace 920) and FIG. 9c is a diagram of the current in the rectifier circuit 905 (shown as a second trace 925).

After the semiconductor switching device Q1 120 is turned off at time event 930, the voltage potential at the node HBM begins to drop and the current in the rectifier circuit 905 may drop to a negative value 935, which it may maintain for a duration of the high to low dead time. When the current in the rectifier circuit 905 returns to about zero at time event 940, the voltage potential at the node HBM may have also reached zero or a minimum and the semiconductor switching device Q2 122 may be turned on with ZVS.

FIG. 9d illustrates a sequence of events 950 in the detecting of an end condition of the dead time, wherein the end condition comprises the current in the rectifier circuit 905 returning to being substantially zero after maintaining a relatively constant negative value. The detecting the end condition may begin with storing the current in the rectifier in a memory (block 955). This may be performed to ensure that the current in the rectifier has indeed been at a negative value for a period of time prior to returning to about zero. Then, the current in the rectifier circuit 905 may be compared with a threshold as well as checking the stored value of the current in the rectifier circuit 905 if it has previously been negative (block 960). If both conditions are true, then the end condition of the dead time may have been met (block 965). If both conditions are not met, then the end condition of the dead time may not have been met and more time may be permitted to elapse.

Turning back now to FIG. 6a, with the end condition for the dead time detected, the dead time may be terminated (block 615). The dead time may be terminated by turning on the semiconductor switching device Q2 122, for example.

Figure 6B:
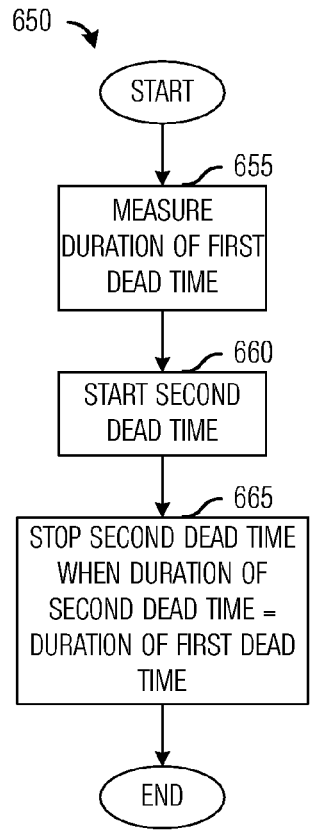
FIG. 6b is a diagram of a sequence of events in the adaptive control of a dead time.

FIG. 6b illustrates a sequence of events 650 in the adaptive control of the duration of a dead time. The adaptive control of the duration of the dead time as described in the sequence of events 600 may be used in situations wherein it may be possible to detect a ZVS switching condition. The sequence of events 650 may be used to adaptive control the duration of a dead time by exploiting a symmetry that may be present between corresponding dead times, such as between a high to low dead time and a low to high dead time. The sequence of events 650 may use a measured duration of a dead time and then apply the measured duration to a corresponding dead time.

The adaptive control of the duration of a dead time may begin with by measuring a duration of a first dead time (block 655). The measuring of the duration of the first dead time may be accomplished using digital techniques or analog techniques or a combination of both. Digital measurement of the duration of the first dead time may involve the use of a clock signal having a period that is substantially shorter than the duration of the first dead time and a counter to count a number of clock cycles elapsing during the first dead time. The duration of the first dead time may then be computed by multiplying the clock cycle count with the period of the clock signal.

Analog measurement of the duration of the first dead time may be achieved by not precisely measuring the duration of the first dead time but by allowing a signal to reach a value that may be dependent on the duration of the first dead time and then using the value to determine when to terminate a second dead time. For example, the signal may rise to a value proportional to the duration of the first dead time and the second dead time may persist until the signal drops from the value down to substantially zero.

With a measure of the duration of the first dead time achieved (block 655), the second dead time may be allowed to start (block 660). The second dead time may be allowed to continue until a measure of the duration of the second dead time is substantially equal to the measure of the duration of the first dead time (block 665). At this point, the second dead time may be terminated.

Figure 10:
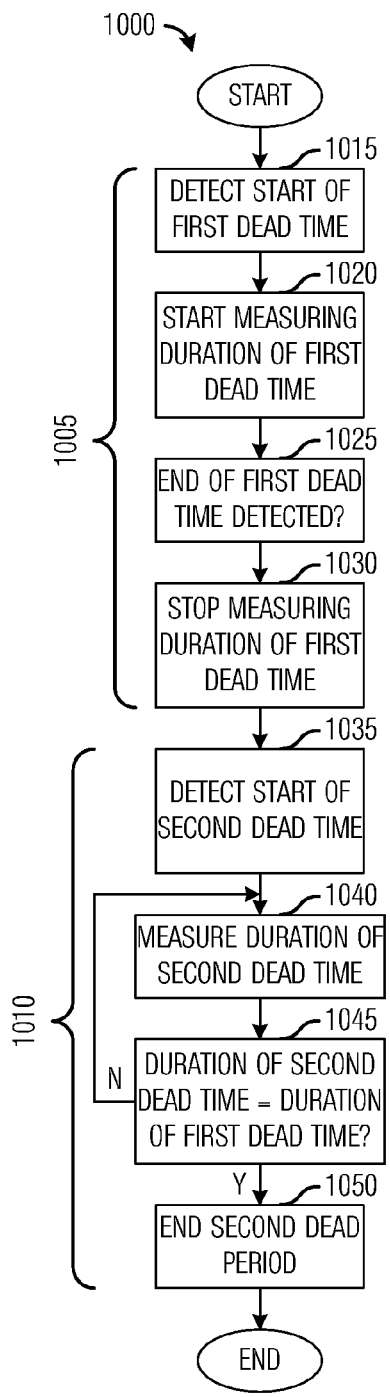
FIG. 10 is a diagram of a sequence of events in adaptively controlling the duration of a high to low dead time and a low to high dead time.

FIG. 10 illustrates a sequence of events 1000 for use in adaptively controlling the duration of a high to low dead time and a low to high dead time. The adaptive control of the duration of a high to low dead time and a low to high dead time (or vice versa) may be partitioned into two distinct stages: a first stage 1005 that may involve the adaptive control of the high to low dead time and a second stage 1010 that may involve the adaptive control of the low to high dead time.

The first stage 1005 may also involve the measurement of the high to low dead time. The adaptive control and measure of the high to low dead time may begin with a detecting of the beginning of the high to low dead time (block 1015). The high to low dead time may begin with a turning off of the semiconductor switching device Q1 120 with the semiconductor switching device Q2 122 already off. With the detection of the beginning of the high to low dead time, a measuring of a duration of the high to low dead time may also begin (block 1020). As discussed previously, the measuring of the duration of the high to low dead time may be performed using digital, analog, or both techniques.

The high to low dead time may continue until an end of the high to low dead time is detected (block 1025). An end of the high to low dead time may be a detectable condition that may be conducive to ZVS, for example, and may include a current through a shunt resistor rapidly becoming negative, a gate current of a gate driver rapidly becoming positive, a current through a rectifier circuit becoming substantially zero after having been negative for an entirety of the high to low dead time, and so forth. The high to low dead time may be ended with the semiconductor switching device Q2 122 turning on. Once the end of the high to low dead time has been detected, the measuring of the duration of the high to low dead time may be stopped (block 1030).

The adaptive control of the low to high dead time (the second stage 1010) may begin with a detecting of the beginning of the low to high dead time (block 1035). The low to high dead time may begin with a turning off of the semiconductor switching device Q2 122 with the semiconductor switching device Q1 120 already off. With the detection of the beginning of the low to high dead time, a measuring of a duration of the low to high dead time may also begin (block 1040). As discussed previously, the measuring of the duration of the low to high dead time may be performed using digital, analog, or both techniques.

As the low to high dead time progresses, the measured duration of the low to high dead time may be compared with the measured duration of the high to low dead time (block 1045). If the measured duration of the low to high dead time is about equal to the measured duration of the high to low dead time, then the low to high dead time may be ended (block 1050). If the measured duration of the low to high dead time is not about equal to the measured duration of the high to low dead time, then the low to high dead time may be allowed to continue. The measuring of the duration of the low to high dead time (block 1040) and the comparison of the measured duration with the measured duration of the high to low dead time (block 1045) may continue until the low to high dead time does become about equal to the measured duration of the high to low dead time and the low to high dead time is ended (block 1050).

Although the discussion focuses on the adaptive control and measuring of the high to low dead time and then using the measured duration of the high to low dead time to adaptively control the low to high dead time, it may be possible to reverse the two. The low to high dead time may be adaptively controlled and measured, with the measured duration of the low to high dead time then being used to adaptive control the high to low dead time. Therefore, the discussion of the adaptive control and measuring of the high to low dead time should not be construed as being limiting to either the scope or the spirit of the embodiments.

Although the embodiments have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for adaptively controlling a dead time in a half bridge circuit having an upper portion with an upper switching element and a lower portion with a lower switching element, the method comprising:
   detecting a start of the dead time, the dead time comprising a time period between turning off the upper switching element and turning on the lower switching element during operation of the half bridge circuit;
   detecting an ending condition of the dead time, wherein the detecting is based on a first current flowing through a shunt resistor in the lower portion or a second current through a lower gate driver of the lower switching element; and
   ending the dead time based on detecting the ending condition, wherein ending the dead time comprises changing the lower switching element from an OFF state to an ON state.

2. The method of claim 1, wherein the detecting the start of the dead time comprises detecting when the upper switching element changes from an ON state to an OFF state with the lower switching element in an OFF state.

3. The method of claim 1, wherein the lower switching element and the shunt resistor are serially arranged, wherein the detecting the ending condition of the dead time comprises:
   measuring the first current; and
   determining the ending condition based on a comparison of the first current and a first threshold.

4. The method of claim 1, wherein the lower switching element and the shunt resistor are serially arranged, wherein the first current comprises a reactive portion and a non-reactive portion, and wherein the detecting the ending condition of the dead time comprises:
   measuring a polarity of the first current; and
   determining the ending condition in response to a determining that the first current has a polarity that is opposite to a polarity of the non-reactive portion of the first current.

5. The method of claim 1, wherein the upper switching element and the lower switching element are serially arranged, wherein the upper switching element is controlled by an upper gate driver and the lower switching element is controlled by the lower gate driver, wherein the detecting the ending condition of the dead time comprises:
   measuring the second current; and
   determining the ending condition in response to a determining that the second current is greater than a second threshold, the second threshold having a same polarity as a polarity of the second current required to turn on the lower switching element.

6. A method for adaptively controlling dead time of a half bridge circuit, the method comprising:
   adaptively controlling a first dead time, the first dead time comprising a time period between turning off a first driver and turning on a second driver during operation of the half bridge circuit;
   measuring a duration of the first dead time, wherein the duration is based on an accumulated charge on a capacitor; and
   adaptively controlling a second dead time using the duration of the first dead time, wherein the using comprises discharging the accumulated charge on the capacitor, the second dead time comprising a time period between turning off the second driver and turning on the first driver during operation of the half bridge circuit.

7. The method of claim 6, wherein the adaptively controlling the first dead time comprises:
   detecting a start of the first dead time;
   detecting an ending condition of the first dead time; and
   ending the first dead time.

8. A method for adaptively controlling dead time of a half bridge circuit, the method comprising:
    adaptively controlling a first dead time, the first dead time comprising a time period between turning off a first driver and turning on a second driver during operation of the half bridge circuit;
    measuring a duration of the first dead time, wherein the duration is related to an accumulated charge on a capacitor;
    adaptively controlling a second dead time using the duration of the first dead time, wherein the using comprises discharging the accumulated charge on the capacitor, the second dead time comprising a time period between turning off the second driver and turning on the first driver during operation of the half bridge circuit;
    wherein the adaptively controlling the first dead time comprises
        detecting a start of the first dead time,
        detecting an ending condition of the first dead time, and ending the first dead time; and
    wherein the measuring the duration of the first dead time comprises
        starting an accumulation of the accumulated charge on the capacitor in response to a determining that the first dead time has started, and
        stopping the accumulation of the accumulated charge on the capacitor in response to a determining that the ending condition has been detected.

9. The method of claim 8, wherein the adaptively controlling the second dead time comprises:
    detecting a start of the second dead time;
    discharging the accumulated charge on the capacitor; and
    ending the second dead time in response to a determining that the accumulated charge on the capacitor is substantially equal to zero.

10. The method of claim 9, wherein the discharging of the accumulated charge is at substantially a same rate as the accumulation of the accumulated charge.

11. The method of claim 9, wherein the ending the second dead time is in response to a determining that the accumulated charge on the capacitor has discharged to a non-linear point wherein the discharging is no longer substantially linear.

12. The method of claim 11, wherein the ending the second dead time is in response to a determining that the accumulated charge on the capacitor has discharged to a threshold greater than or about equal to the non-linear point.

13. The method of claim 12, wherein the ending the second dead time further comprises delaying the ending the second dead time by a time period substantially equal to a discharging of the charge of the capacitor at the threshold down to substantially zero at a linear discharge rate.

14. The method of claim 8, wherein the ending the first dead time further comprises not ending the first dead time until the accumulated charge on the capacitor has charged to at least a minimum charge.

15. The method of claim 8, wherein the ending the first dead time further comprises ending the first dead time in response to a determining that the accumulated charge on the capacitor has charged to a maximum charge even if the ending condition has not been detected.

16. The method of claim 6, wherein the measuring of the first dead time comprises:
    starting a clock signal generator in response to a determining that the first dead time has started;
    starting a counter to count periods of a signal generated by the clock signal generator; and
    stopping the counter in response to a determining that an ending condition of the first dead time has been detected.

17. An electronic circuit comprising:
    a half bridge circuit comprising a first semiconductor switching device and a second semiconductor switching device serially arranged with respect to a first power rail and a second power rail of a power supply, the half bridge circuit configured to selectively couple a load to the power rails of the power supply;
    a drive circuit coupled to the half bridge circuit, the drive circuit configured to generate control signals to control a state of the first semiconductor switching device and a state of the second semiconductor switching device; and
    a detection circuit coupled to the half bridge circuit and to the drive circuit, the detection circuit configured to measure a value of a first current flowing through a shunt resistor coupled to the second semiconductor switching device or a second current flowing through a gate driver coupled to the second semiconductor switching device, the value to determine a state suitable for zero voltage switching or to indicate an ending condition of a dead time, the dead time comprising a time period between turning off the first semiconductor switching device and turning on the second semiconductor switching device, wherein the drive circuit is configured to turn on the second semiconductor switching device based upon detecting the ending condition of the dead time.

18. The electronic circuit of claim 17, wherein the shunt resistor is coupled between the second semiconductor switching device and the second power rail, the shunt resistor to permit a measuring a current flowing through the second semiconductor switching device.

19. The electronic circuit of claim 18, wherein the detection circuit comprises a first comparator having a first input coupled to the shunt resistor and a second input coupled to a reference value, the comparator to determine when the current has a polarity opposite to a non-reactive portion of a current flowing through the shunt resistor.

20. The electronic circuit of claim 18, wherein the detection circuit comprises a first comparator having a first input coupled to the shunt resistor and a second input coupled to a reference voltage, the comparator to determine when a voltage drop across the shunt resistor is more negative than the reference voltage.

21. The electronic circuit of claim 17, wherein the detection circuit comprises a current detection circuit to compare the second current to a reference value having a same polarity as a polarity of the second current required to turn on the second semiconductor switching device.

* * * * *